United States Patent
Richter et al.

(10) Patent No.: US 7,192,909 B2
(45) Date of Patent: Mar. 20, 2007

(54) USE OF POLYOLEFIN WAXES IN THE FIELD OF PLASTICS PROCESSING

(75) Inventors: Eric Richter, Thierhaupten (DE); Harald Kiesel, Friedberg (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 229 days.

(21) Appl. No.: 10/239,605

(22) PCT Filed: Mar. 14, 2001

(86) PCT No.: PCT/EP01/02864

§ 371 (c)(1),
(2), (4) Date: Sep. 24, 2002

(87) PCT Pub. No.: WO01/72855

PCT Pub. Date: Oct. 4, 2001

(65) Prior Publication Data

US 2003/0114322 A1   Jun. 19, 2003

(30) Foreign Application Priority Data

Mar. 29, 2000   (DE) ................. 100 15 593

(51) Int. Cl.
C08F 10/20   (2006.01)
C10M 143/00   (2006.01)

(52) U.S. Cl. .............. 508/591; 106/270; 524/487; 524/568; 524/583

(58) Field of Classification Search ........... 508/591
See application file for complete search history.

(56) References Cited

U.S. PATENT DOCUMENTS

| | | | |
|---|---|---|---|
| 5,414,035 A | 5/1995 | Lindner et al. | 524/181 |
| 5,707,772 A | 1/1998 | Akimoto et al. | 430/110 |
| 5,723,705 A | 3/1998 | Herrmann et al. | 585/9 |
| 5,928,825 A | 7/1999 | Eguchi et al. | |
| 5,998,547 A | 12/1999 | Hohner et al. | 525/301 |
| 6,080,902 A * | 6/2000 | Herrmann et al. | 585/512 |
| 6,107,530 A | 8/2000 | Hohner et al. | 585/9 |
| 6,143,846 A * | 11/2000 | Herrmann et al. | 526/170 |
| 6,211,303 B1 * | 4/2001 | Hohner | 525/388 |
| 6,331,590 B1 * | 12/2001 | Herrmann et al. | 525/55 |
| 6,348,547 B1 * | 2/2002 | Deckers et al. | 525/333.8 |
| 6,384,148 B1 | 5/2002 | Herrmann et al. | 525/333.8 |
| 6,407,189 B1 * | 6/2002 | Herrmann | 526/160 |
| 6,761,764 B2 * | 7/2004 | Krendlinger et al. | 106/502 |

FOREIGN PATENT DOCUMENTS

| | | |
|---|---|---|
| EP | 0 440 504 | 8/1991 |
| EP | 0 571 882 | 1/1993 |
| EP | 0 632 063 | 1/1995 |
| EP | 0 916 700 | 5/1999 |
| EP | 1 013 672 | 6/2000 |
| WO | WO 96/11228 | 4/1996 |
| WO | 0 889 095 | 1/1999 |
| WO | WO 99/33913 | 7/1999 |

OTHER PUBLICATIONS

R. Gachter, H. Muller (Ed.): "Kunststoffadditive", 3. Auflagbe, Hanser Verlag, Munchen, 1989, pp. 443-503.
Ullmann's Encycolpadia of Industrial Chemistry, Weinheim, Basel, Cambridge, New York, Tokyo, 5. Edition, vol. A28, pp. 146-163.
K. Woresch: Gleitmittel fur PVE in: G. Becker, D. Braun (Hrsg.): Kunststoff-Handbuch Polyvinylester Bd. 2/1,2. Auflage., Hanser Verlag, Munchen, 6.5.2, pp. 571-595.
English abstract for JP 11071545, Mar. 16, 1999.
English abstract for JP 09160284, Jun. 20, 1997.
English abstract for JP 09134035, May 20, 1997.
English abstract for JP 09 015897, Jan. 17, 1997.
U.S. Appl. No. 11/182,467, by Lechner et al., filed Jul. 15, 2005.

* cited by examiner

*Primary Examiner*—Ellen M. McAvoy
(74) *Attorney, Agent, or Firm*—Anthony A. Bisulca

(57) ABSTRACT

The invention relates to the use of polyolefin waxes as external lubricants and release agents for plastics. Said polyolefin waxes are produced by using metallocene catalysts, whereby the polyolefin waxes are homopolymerizates of ethylene or are copolymerizates of ethylene with one or more 1-olefins, and linear or branched, substituted or non-substituted olefins having 3–18 C atoms are used as 1-olefins. The processable plastic mixtures produced in this manner have a distinctively longer tack-free time and exhibit an improved behavior with regard to mold release.

16 Claims, No Drawings

USE OF POLYOLEFIN WAXES IN THE FIELD OF PLASTICS PROCESSING

The invention relates to the use of polyolefin waxes and their derivatives which have been modified in a polar manner, particularly as lubricants and release agents in the processing of plastics.

Apart from a few exceptions, the processing of plastics is carried out in the melt. Virtually no plastic can survive the associated structural changes and changes of state without its chemical structure being changed. Crosslinking, oxidation, molecular weight changes and thus also changes in the physical and technological properties can result. To reduce the stress on the polymers during processing, various additives are used, depending on the plastic. For this reason, not inconsiderable amounts of lubricants, in particular polyolefin waxes, are mixed into many plastics with the object of improving the flow of the melt, i.e. reducing the internal and external friction. These lubricants thus not only have the function of improving the rheology of the polymer melt but also the function of reducing damage to the material.

Lubricants perform many tasks during processing. They are responsible for a plastic breaking down sufficiently and in a targeted manner in the processing machine and being present as a homogeneous melt. Furthermore, lubricants prevent excessive adhesion of the polymer melt to hot machine parts. An overview of the lubricants used in plastics and the manner in which they function may be found in R. Gächter, H. Müller (Ed.): "Kunststoffadditive", 3rd edition, Hanser Verlag, Munich 1989, p. 443 ff.

The use of polyolefin waxes and their derivatives which have been modified in a polar manner in wide areas of the processing of thermoplastics is prior art. The waxes are prepared by the Ziegler process in a high-pressure polymerization or by degradation reactions and may be modified in a polar manner (cf. Ullmann's Encyclopedia of Industrial Chemistry, Weinheim, Basel, Cambridge, New York, Tokyo, 5th edition, Volume A 28, p. 146 ff). The term polyolefin waxes generally refers to the homopolymers and copolymers of ethene, propene and other α-olefins. Polyolefin waxes which have been modified in a polar manner are oxidized polyolefins or polyolefins which have been grafted with polar reagents. They are used in polyolefins (polypropylene, polyethylene and their copolymers), in engineering thermoplastics (polyesters, polyamides, polycarbonates, styrene polymers, polyoxymethylenes and thermoplastic elastomers) and polar vinyl polymers (polyvinyl chloride and copolymers of vinyl chloride, chlorinated polyethylene). Their task is not only to improve the flow by reducing the internal friction but especially the release action. Polyolefin waxes have the task of preventing adhesion of polymer melts to hot machine parts by acting as release agents.

The greatest importance of polyolefin waxes and their derivatives which have been modified in a polar manner is in the field of rigid PVC. These products are usually used in this application area for regulating the melting behavior and the tendency to stick to the processing machines. They are generally used in combination with other waxes, e.g. montan waxes, fatty acid derivatives or paraffins. The use of such products has been described in the literature (e.g. K. Worschech: Gleitmittel für PVC in: G. Becker, D. Braun (editors): Kunststoff-Handbuch, polyvinyl chloride, Volume 2/1, 2nd edition, Hanser Verlag, Munich, p. 571 ff.) and in the patent literature, e.g. U.S. Pat. No. 5,414,035 and WO-96 11 228. There, the use of polyethylene waxes having a particular viscosity for calendered films, in particular for blister packs and credit cards, and for injection molding, in particular of pipe fittings, is disclosed. The calendered films have a high transparency, stability and plate-out resistance. The injection-molded parts display improved properties of the finished parts.

Polyolefin waxes are used in various forms as lubricant in industry. They can be added as pure product to a plastic in various ways. Polyolefin waxes are also used as mixtures (powder blend or melt blend) in combination with other lubricants such as montan waxes and their salts, fatty acid derivatives and their salts, paraffins, other polyolefin waxes and their derivatives which have been modified in a polar manner, amide waxes, silicones and fluorinated plastics. Polyolefin waxes are also constituents of additive mixtures (one packs) which may comprise not only lubricants but also, for example, heat stabilizers, costabilizers, UV absorbers, antioxidants, light stabilizers, antistatics, fillers, pigments and processing aids.

Polyolefin waxes can be introduced into the operating polymerization process during the preparation of a plastic. Furthermore, they can be added to a polymer before a processing step. Various methods are possible for this: polyolefin waxes can be dusted onto a polymer, compounded in or introduced into a plastic in a cold or hot powder mixing process.

The industrially used polyolefin waxes display some disadvantages when used as lubricants and release agents in plastics. Conventional waxes have to be added in relatively large amounts in order to achieve optimal effectiveness as lubricants and release agents. However, excessively high additions of waxes lead to plate-out and deposits on machine parts, and also to migration of waxes to the surface of finished articles resulting in deterioration of printability and other subsequent processing steps (e.g. adhesive bonding, metallization), and, particularly in the case of PVC, to a considerably reduced energy input in processing machines with the consequence of excessively late or poorly controllable melting of the PVC mixture.

It has now been found that polyolefin waxes which have been prepared by means of metallocene catalysts are particularly suitable as lubricants and release agents in plastics. Thus, the achievable lubricating and release action of such polyolefin waxes in plastics is significantly more pronounced than when using conventional polyolefin waxes.

The improved lubricating and release action of the polyolefin waxes claimed enables a better effect to be achieved at the same added amount, or, owing to the better action, a smaller amount can be added in order to reduce general disadvantages of lubricants, e.g. plate-out, deposits or reduced printability.

Since nothing has previously been known about the relationship between the molecular structure and, in particular, the molecular weight distribution of polyethylene waxes and their effectiveness as lubricants and release agents, the results found were completely surprising.

The invention accordingly provides for the use of polyolefin waxes prepared by means of metallocene catalysts, where the polyolefin waxes are homopolymers of ethylene or copolymers of ethylene with one or more 1-olefins which may be linear or branched, substituted or unsubstituted and have 3–18 carbon atoms, as lubricants and release agents for plastics.

The 1-olefins preferably have 3–6 carbon atoms. Examples are propene, 1-butene, 1-hexene, 1-octene and 1-octadecene, also styrene. Preference is given to copolymers of ethylene with propene or 1-butene. The copolymers have an ethylene content of 70–99.9% by weight, preferably 80–99% by weight. If the 1-olefins are substituted, the substituent is preferably an aromatic radical which is conjugated with the double bond of the 1-olefin.

Particularly suitable polyolefin waxes are those having a dropping point in the range from 90 to 130° C., preferably from 100 to 120° C., a melt viscosity at 140° C. in the range from 10 to 10,000 mPa·s, preferably from 50 to 5000 mPa·s and a density at 20° C. in the range from 0.89 to 0.96 g/cm$^3$, preferably from 0.91 to 0.94 g/cm$^3$.

Metallocene catalysts for preparing the polyolefin waxes are chiral or nonchiral transition metal compounds of the formula $M^1L_x$. The transition metal compound $M^1L_x$ contains at least one central metal atom $M^1$ to which at least one π ligand, e.g. a cyclopentadienyl ligand, is bound. In addition, substituents such as halogen atoms or alkyl, alkoxy or aryl groups may be bound to the central metal atom $M^1$. $M^1$ is preferably an element of main group III, IV, V or VI of the Periodic Table of the Elements, e.g. Ti, Zr or Hf. For the purposes of the present invention, cyclopentadienyl ligands are unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl or octahydrofluorenyl radicals. The π ligands can be bridged or unbridged, with single and multiple bridges, including bridges via ring systems, being possible. The term metallocene also encompasses compounds having more than one metallocene fragment, known as multinuclear metallocenes. These can have any substitution patterns and forms of bridging. The individual metallocene fragments of such multinuclear metallocenes can be either of the same type or different from one another. Examples of such multinuclear metallocenes are described, for example, in EP-A-0 632 063.

Examples of structural formulae of metallocenes and of their activation by means of a cocatalyst are given, inter alia, in EP-A-0 571 882.

Apart from nonpolar metallocene waxes, it is also possible to use their derivatives obtained by polar modification. The modification is carried out, for example, by oxidation using oxygen or oxygen-containing gases or by grafting with polar monomers, for example maleic acid or its derivatives.

The metallocene-based polyolefin waxes described can be added in various forms to a plastic:

The polyolefin waxes can be applied individually to cold or hot carriers (e.g. the plastic) in a rotating drum, can be compounded in or can be mixed into a plastic in a cold or hot powder mixing process. They can be used as a powder blend or melt blend together with other lubricants such as montan waxes and their salts, fatty acid derivatives and their salts, paraffins, other polyolefin waxes and their derivatives which have been modified in a polar manner, amide waxes, silicones and fluoropolymers.

The polyolefin waxes can be used as constituents of additive mixtures (one packs). These one packs comprise various lubricants, heat stabilizers, costabilizers, UV absorbers, antioxidants, light stabilizers, antistatics, fillers, pigments, processing aids and other active substances.

For optimized dispersion, the polyolefin waxes are preferably used in micronized form in mixtures of predominantly pulverulent starting materials. They can be added during the polymerization to prepare a plastic.

The polyolefin waxes are preferably used in predispersed form as wax concentrates (masterbatches) in a carrier polymer (e.g. polyolefin).

In the examples below, the following polyolefin waxes are compared in respect of their lubricating action and release action in plastics.

EXAMPLES

| Product | Process | Dropping point | Acid number | Viscosity, 140° C. |
|---|---|---|---|---|
| Ex. 1 | Ethylene homopolymer | Metallocene | 125° C. | | 320 mPa · s |
| Ex. 2 | Ethylene-propylene copolymer | Metallocene | 116° C. | | 680 mPa · s |
| Ex. 3 | Oxidized derivative* | Metallocene | 105° C. | 18 mg KOH/g | 250 mPa · s |
| Comp. 1 | Ethylene homopolymer | Ziegler | 125° C. | | 300 mPa · s |
| Comp. 2 | Ethylene-propylene copolymer | Ziegler | 118° C. | | 600 mPa · s |
| Comp. 3 | Ethylene homopolymer | High-pressure | 108° C. | | 600 mPa · s |
| Comp. 4 | Oxidized derivative** | Ziegler | 108° C. | 18 mg KOH/g | 250 mPa · s |

*Ethylene-propylene copolymer wax oxidized by means of air from Example 2
**Ethylene-propylene copolymer wax oxidized by means of air from Comparison 2

Release Action in Rigid PVC:

To assess the release action of lubricants in rigid PVC, it is customary to determine adhesion-free times in two-roll mills. For this purpose, a ready-to-process PVC mixture is processed on a roll mill (190° C., 15/20 rpm, gap width about 0.5 mm) and the time until the PVC melt sticks is measured. A long adhesion-free time indicates good release action of the lubricant being tested.

| PVC formulation used: | |
|---|---|
| Vinnolit ® S 3160 | 100.0 phr |
| Irgastab ® 17 MOK | 1.5 phr |
| Paraloid ® BTA 702 S | 8.0 phr |
| Edenol ® D 81 | 0.5 phr |
| Distearyl phthalate | 0.3 phr |
| Test product | 0.3 phr |

Results Obtained:

| | |
|---|---|
| Example 1 | 18 min adhesion-free time |
| Example 2 | 17 min adhesion-free time |
| Example 3 | 21 min adhesion-free time |
| Comparison 1 | 11 min adhesion-free time |
| Comparison 2 | 9 min adhesion-free time |
| Comparison 3 | 9 min adhesion-free time |
| Comparison 4 | 16 min adhesion-free time |

Release Action in Polyamide (PA):

The release action of lubricants in engineering plastics is customarily quantified by means of demolding force measurements in injection molding. For this purpose, a cylindrical shell is produced by injection molding and the maximum force required to remove the shell from the tool is recorded as demolding force. A low demolding force indicates good release action of the lubricant used.

The following results were determined on an unfilled/unreinforced PA 6:

| | |
|---|---|
| Example 1: | 550 N, addition = 0.3% |
| Example 2: | 650 N, addition = 0.3% |
| Example 3: | 500 N, addition = 0.3% |
| Comparison 1: | 900 N, addition = 0.3% |
| Comparison 2: | 980 N, addition = 0.3% |
| Comparison 3: | 850 N, addition = 0.3% |
| Comparison 4: | 800 N, addition = 0.3% |

Release Action in Polypropylene (PP):

The release action of lubricants in polyolefins is customarily quantified by means of demolding force measurements in injection molding. For this purpose, a cylindrical shell is produced by injection molding and the maximum force required to remove the shell from the tool is recorded as demolding force. A low demolding force indicates good release action of the lubricant used.

The following results were determined on a talc-reinforced PP/EPDM compound:

| | |
|---|---|
| Example 1: | 750 N, addition = 0.1% |
| Example 2: | 700 N, addition = 0.1% |
| Example 3: | 600 N, addition = 0.1% |
| Comparison 1: | 900 N, addition = 0.1% |
| Comparison 2 | 1050 N, addition = 0.1% |
| Comparison 3: | 950 N, addition = 0.1% |
| Comparison 4: | 850 N, addition = 0.1% |

The invention claimed is:

1. A method for forming a plastic comprising the step of adding a lubricant to the plastic, wherein the lubricant is at least one polyolefin wax prepared by means of metallocene catalysts, where the at least one polyolefin wax is an ethylene homopolymer wax or an ethylene copolymer wax with one or more 1-olefins which may be linear or branched, substituted or unsubstituted and have 3–18 carbon atoms, wherein the lubricant is present in an amount from 0.1 to 0.3% by weight and wherein the plastic is selected from the group consisting of polyamides, polypropylene and polyvinyl chloride.

2. The method as claimed in claim 1, wherein the ethylene copolymer wax contains 0.1–30% by weight of one or more 1-olefins having a chain length of from 3 to 18 carbon atoms.

3. The method as claimed in claim 1, wherein the 1-olefins have a chain length of from 3 to 6 carbon atoms.

4. The method as claimed in claim 2, wherein the ethylene copolymer wax contains 0.1–30% by weight of propene or 1-butene.

5. The method as claimed in claim 1 wherein the at least one polyolefin wax has a dropping point in the range from 90 to 130° C. and a melt viscosity at 140° C. in the range from 10 to 10,000 mPa s.

6. The method as claimed in claim 1, wherein the at least one polyolefin wax has been modified in a polar manner.

7. The method as claimed in claim 1, wherein the at least one polyolefin wax has been micronized.

8. A plastic article made in accordance with the method of claim 1.

9. A method for forming a plastic comprising the step of adding a release agent to the plastic, wherein the release agent is at least one polyolefin wax prepared by means of metallocene catalysts, where the at least one polyolefin wax is an ethylene homopolymer wax or an ethylene copolymer wax with one or more 1-olefins which may be linear or branched, substituted or unsubstituted and have 3–18 carbon atoms, wherein the release agent is present in an amount from 0.1 to 0.3% by weight and wherein the plastic is selected from the group consisting of polyamides, polypropylene and polyvinyl chloride.

10. The method as claimed in claim 9, wherein the ethylene copolymer wax contains 0.1–30% by weight of one or more 1-olefins having a chain length of from 3 to 18 carbon atoms.

11. The method as claimed in claim 9, wherein the 1-olefins have a chain length of from 3 to 6 carbon atoms.

12. The method as claimed in claim 10, wherein the ethylene copolymer wax contains 0.1–30% by weight of propene or 1-butane.

13. The method as claimed in claim 9, wherein the at least one polyolefin wax has a dropping point in the range from 90 to 130° C. and a melt viscosity at 140° C. in the range from 10 to 10,000 mPa s.

14. The method as claimed in claim 9, wherein the at least one polyolefin wax has been modified in a polar manner.

15. The method as claimed in claim 9, wherein the at least one polyolefin wax has been micronized.

16. A plastic article made in accordance with the method of claim 9.

* * * * *